UNITED STATES PATENT OFFICE.

WILLIAM E. GRAVES, OF TOPEKA, KANSAS.

TIRE-FILLER.

1,104,886.  Specification of Letters Patent.  Patented July 28, 1914.

No Drawing.  Application filed January 30, 1911.  Serial No. 605,587.

*To all whom it may concern:*

Be it known that I, WILLIAM E. GRAVES, a citizen of the United States, residing at Topeka, in the county of Shawnee and State of Kansas, have invented certain new and useful Improvements in Tire-Fillers; and I do declare the following to be a full, clear, and exact description of the invention, such as will enable others skilled in the art to which it appertains to make and use the same.

My invention relates to a composition of matter for use as a filler for automobiles or like tires, and has for its object to provide a composition for that purpose, having the required resiliency for affording easy travel of a vehicle, which is of light weight, is not affected by changes of temperature, and is of substantial durability.

In the application of my invention, the composition, the constituency and process of compounding which will be hereinafter described, is placed in a suitable casing, which in turn is inclosed within an outer casing like or similar to the outer casing of an ordinary pneumatic tire, and the finished tire used on a vehicle in the ordinary manner. In order to obviate flattening of the tire under a load, the filler must have sufficient body to sustain considerable weight; to prevent the filler from "creeping" so that the mass will not "bunch" and form humps or waves, the filler must have sufficient flexibility to cause each part to return to its natural position after it has passed its ground contact, as well as an adhesive element that will stick same to its casing; and in order to prevent hardening, the filler must be unaffected by extremes of heat and cold. It is also readily apparent that the filler must not be so heavy that it will add burden to the vehicle upon which it is used.

I have discovered that a composition of ground cork, chipped rubber and glue, mixed in substantially the following proportions *i. e.*, five pounds of ground cork, one-half pound chipped rubber, and two and one-half pounds of glue, when forced into a suitable casing under about eighty pounds pressure, will form a core that meets all of the above requirements.

In mixing the ingredients the glue is heated to the boiling point and then thoroughly mixed with the cork and rubber (which may be cold) to form a homogeneous mass. This mass is forced into a casing while hot and allowed to cool.

When the casing containing the composition is placed in an outer casing, a tire is formed which may be used in the ordinary manner, the cork and rubber affording the resiliency usually afforded by an inner pneumatic tube.

By using cork in the composition, the weight of the tire is kept down without destroying the resiliency, and the cork, being a non-conductor of heat or cold, relieves the tire from the ill effects of extreme weather conditions.

By using a flexible glue the cork and rubber particles are held together without causing the core to harden. An example of a flexible glue which may be used as an element in my composition and the process of making same consists of seven pounds of hide glue set about twelve hours, to allow the glue to soften, and then boiled for two hours; to the boiling mixture is added one pound of glycerin, two pounds of castor-oil and five pounds of molasses. The complete mixture is then boiled for one hour, being continually stirred while boiling. The chipped rubber which I use in the composition is of medium softness, being preferably of about the kind used for rubber bands or pencil erasers.

Having thus described my invention, what I claim as new therein and desire to secure by Letters-Patent is:—

A composition of matter for filling tires consisting of the following materials in substantially the proportions stated; viz: ground cork, five pounds, chipped rubber, one-half pound, and flexible glue, the elements of which aggregate two and one-half pounds.

In testimony whereof I affix my signature in presence of two witnesses.

WILLIAM E. GRAVES.

Witnesses:
 MYRTLE N. JACKSON,
 ARTHUR W. CAPS.